United States Patent
Birk et al.

(10) Patent No.: US 12,421,135 B2
(45) Date of Patent: Sep. 23, 2025

(54) METAL POWDER MIXTURE AS HEAT SOURCE FOR TREATING ENVIRONMENTAL MEDIUM

(71) Applicant: Tersus Environmental, LLC, Wake Forest, NC (US)

(72) Inventors: Gary M. Birk, Wake Forest, NC (US); David F. Alden, Wake Forest, NC (US); John Sankey, Vancouver (CA)

(73) Assignee: Tersus Environmental LLC, Wake Forest, NC (US)

( * ) Notice: Subject to any disclaimer, the term of this patent is extended or adjusted under 35 U.S.C. 154(b) by 403 days.

(21) Appl. No.: 17/982,085

(22) Filed: Nov. 7, 2022

(65) Prior Publication Data
US 2024/0150198 A1    May 9, 2024

(51) Int. Cl.
| | | |
|---|---|---|
| *C02F 3/28* | (2023.01) | |
| *B09C 1/00* | (2006.01) | |
| *B09C 1/08* | (2006.01) | |
| *C02F 1/04* | (2023.01) | |
| *C02F 1/28* | (2023.01) | |
| *C02F 1/70* | (2023.01) | |

(Continued)

(52) U.S. Cl.
CPC .............. *C02F 1/043* (2013.01); *B09C 1/002* (2013.01); *B09C 1/08* (2013.01); *C02F 1/283* (2013.01); *C02F 1/705* (2013.01); *C02F 3/28* (2013.01); *B09C 2101/00* (2013.01); *C02F 2101/301* (2013.01); *C02F 2101/36* (2013.01); *C02F 2103/06* (2013.01)

(58) Field of Classification Search
None
See application file for complete search history.

(56) References Cited

U.S. PATENT DOCUMENTS

| | | | | |
|---|---|---|---|---|
| 6,019,548 A | * | 2/2000 | Hoag | .................. B09C 1/08 210/759 |
| 7,290,959 B2 | | 11/2007 | Beyke et al. | |

(Continued)

FOREIGN PATENT DOCUMENTS

WO    WO-2012055818 A * 5/2012 ............... B09C 1/00

OTHER PUBLICATIONS

E. Crownover, et al., "Perfluoroalkyl and Polyfluoroalkyl Substances Thermal Desorption Evaluation", Research Note, Remediation; 2019; 5 pgs.

(Continued)

*Primary Examiner* — Chester T Barry
(74) *Attorney, Agent, or Firm* — Blank Rome LLP

(57) ABSTRACT

A method for treating an environmental medium having organic contaminants is disclosed. A mixture is added to the environmental medium. The environmental medium is heated to activate the mixture and to evaporate the organic contaminants within the environmental medium to generate contaminated vapors. The mixture acts as an additional heat source. The mixture includes a metal powder. The contaminated vapors are extracted via a perforated pipe, thereby removing the organic contaminants in a gaseous form from the environmental medium. The organic contaminants have an initial boiling point in range of 50° C. to 400° C., when immersed in water or in contact with moist soil, measured at a standard atmospheric pressure of 1 atm.

17 Claims, 4 Drawing Sheets

(51) Int. Cl.
    *C02F 101/30*     (2006.01)
    *C02F 101/36*     (2006.01)
    *C02F 103/06*     (2006.01)

(56) References Cited

U.S. PATENT DOCUMENTS

| | | | | |
|---|---|---|---|---|
| 9,004,816 B2* | 4/2015 | Reynolds | ............... | B09C 1/062 |
| | | | | 405/128.55 |
| 10,046,998 B2* | 8/2018 | Di Maiuta | ............ | C09C 1/021 |
| 10,675,664 B2 | 6/2020 | Oberle et al. | | |
| 2008/0272063 A1* | 11/2008 | Boulos | ................ | A62D 3/38 |
| | | | | 210/759 |
| 2009/0029198 A1* | 1/2009 | Jin | ....................... | H01M 8/16 |
| | | | | 429/401 |
| 2011/0123940 A1* | 5/2011 | Szynkarczuk | .......... | B01J 35/23 |
| | | | | 431/278 |
| 2012/0158294 A1* | 6/2012 | Clements | ............ | G01N 1/2273 |
| | | | | 702/150 |
| 2014/0037536 A1* | 2/2014 | Reimerink-Schats | ................... | |
| | | | | C01B 32/33 |
| | | | | 423/579 |
| 2019/0119133 A1* | 4/2019 | Jin | ........................ | C02F 3/109 |
| 2023/0296272 A1* | 9/2023 | Kirschman | ........ | B01D 53/0415 |
| | | | | 55/385.2 |

OTHER PUBLICATIONS

Safety Data Sheet—Klozur SP, Evonik Active Oxygens, LLC, 2021; 10 pgs.

D. H. Huang, et al., "Investigation on the Reaction of Iron Powder Mixture as a Portable Heat Source for Thermoelectric Power Generators", J. Therm. Anal. Calorim; 2014; pp. 1047-1053.

G. Beyke, et al., "In Situ Thermal Remediation of DNAPL and LNAPL using Electrical Resistance Heating", Remediation Summer 2005; pp. 5-22.

* cited by examiner

METAL POWDER MIXTURE AS HEAT SOURCE FOR TREATING ENVIRONMENTAL MEDIUM

TECHNICAL FIELD

The present disclosure generally relates to a method for treating environmental medium having organic contaminants, more particularly relates to a method for treating environmental medium having organic contaminants using a metal powder mixture as a heat source.

BACKGROUND

Current major environmental issue is soil and groundwater contamination. Contamination results from the use of various current or former processes practiced and specific materials used in those processes. In the United States both Federal and State governments have regulations governing hazardous organic and inorganic contaminants in environmental medium since the 1970's. These regulations have promulgated action levels and clean-up standards for numerous organic and inorganic contaminants. The regulations that govern these contaminants in environmental medium provide protocols to investigate and identify the extent of contamination and to evaluate the human health and ecological risk posed because of their release to the environment. The regulations also set out guidelines to develop remedial action alternatives for reducing or eliminating the risk posed by the regulated contaminants, and selection and implementation of remedial measures to achieve cleanup goals to restore the environmental medium so that it can be put back to a productive use.

Regulated organic contaminants in environmental media include both volatile and semi-volatile organic compounds (VOCs and SVOCs) such as, but not limited to halogenated volatile organic compounds (CVOCs), for example, perchloroethylene (PCE), trichloroethene (TCE), trichloroethane (TCA), and vinyl chloride (VC); non-halogenated straight chain hydrocarbons; halogenated and non-halogenated aromatic hydrocarbons; petroleum hydrocarbons; fuel constituents such as benzene, ethylbenzene, toluene, xylene, methyl tertiary butyl ether (MTBE), tertiary butyl alcohol (TBA), and ethylene dibromide (EDB); polynuclear aromatic hydrocarbons (PAHs) including naphthalene and coal tars/creosote; pesticides such as, but not limited to dichlorodiphenyltrichloroethane (DDT); herbicides such as but not limited to agent orange; per- and poly-fluoroalkyl substances (PFAS), a large family of man-made chemicals that have been widely used in industry, consumer products, and aqueous film-forming foam (AFFF) since the 1950s; polychlorinated biphenyls (PCBs), and 1,4-dioxane. The preferred International Union of Pure and Applied Chemistry (IUPAC) name for PCE is tetrachloroethene. PCE is also know under the systematic name perchloroethene and tetrachloroethylene. DCE refers to one of several isomeric forms of the organochloride with the molecular formula $C_2H_2Cl_2$, cis-1,2-DCE, trans-1,2-DCE and 1,1-DCE.

Remediation of VOCs and SVOC in environmental media is a complex problem with limited cost-effective solutions to reduce their impacts on human health and ecological risk. Current practices for soil remediation are excavation and disposal in landfills, large-scale mixing of the soils with cements or other solidifying agents and/or mixing with treatment compounds to degrade the organic contaminants, and in situ remediation approaches. Common technologies for in situ remediation employ a range of abiotic chemical treatments, biologically based remediation, and thermal approaches.

In situ thermal remediation (ISTR) techniques include Thermal Conduction Heating (TCH). Electrical Resistance Heating (ERH), and Steam Enhanced Extraction (SEE). TCH is the process of heat flowing from the hot end of an iron rod (heater well) to the cold end. The heat moves out radially from the heater wells and contaminants in environmental medium also heat up at the same time. TCH is used to treat contaminants that have boiling points higher than water such as PAHs, PFAS, PCBs, and other SVOCs. Contaminants with boiling points less than water such as PCE, TCE and other VOCs can be treated with ERH or SEE. ERH uses the flow of alternating current electricity to heat the environmental medium and evaporate contaminants. SEE involves the injection of steam into the environmental media and the removal of contaminants and vapors from recovery wells. ERH and SEE can only heat the environmental media to the boiling point of water as they are both limited by the presence of water or soil moisture. TCH and ERH requires boiling off water within the treatment zone. In highly transmissive groundwater aquifers, ISTR may require additional groundwater management measures such as installation of a groundwater dewatering system or a hydraulic barrier to minimize the amount of water flowing into the treatment zone. SEE may also be required to augment TCH or ERH in highly transmissive aquifers for complete heating and treatment of both tight zones and permeable zones. Subsequent extraction and capture of organic contaminants is essential to ISTR.

One disadvantage of treating soils ex situ is that it requires the soil to be excavated. Excavation of soils increases costs compared to in situ treatment strategies. The accessible depth for excavation is about 25 feet below ground surface, the reach of an excavator. This restricts the amount of soil that can be treated.

The use of heat applied to environmental medium either in situ or ex situ to volatilize contaminants and capture contaminated vapors by an applied vacuum is a commercially available technology. These current practices may have large carbon footprints. Additional disadvantages include high price point and cost variability, and mechanical complexity. Further, the area where environmental medium is undergoing treatment cannot be used for other purpose. The energy availability for treatment equipment is high. Additional costs may be associated with groundwater management in highly transmissive aquifers.

In situ Chemical Reduction (ISCR) involves the placement of chemical reductants into the contaminated area or in the path of the plume to change contaminants into less toxic or less mobile forms. ISCR relies on biogeochemical processes under anaerobic conditions, typically achieved through the addition of strong reductants that promote both abiotic and biological pathways to chemically reduce persistent organic compounds into harmless end products.

Contact between the chemical reductant and contaminant is very critical in ISCR. The potential of chemical reductant delivery problems exists if there is subsurface heterogeneity such as with the hydraulic conductivity of an aquifer. During injection, the potential exists that the chemical reductant will not be able to reach the full volume being treated if these conditions exist. Additional disadvantages include passivation of iron surfaces, minimizing the effectiveness. As with excavation, the implementation costs increase with depth.

SUMMARY

In one aspect, a method for treating an environmental medium having organic contaminants is disclosed. A mixture is added to the environmental medium. The environmental medium is heated to activate the mixture and to evaporate the organic contaminants within the environmental medium to generate contaminated vapors. The mixture acts as an additional heat source. The mixture includes a metal powder. The contaminated vapors are extracted via a perforated pipe, thereby removing the organic contaminants in a gaseous form from the environmental medium. The organic contaminants have an initial boiling point in a range of 50° C. to 400° C., when immersed in water or in contact with moist soil, measured at a standard atmospheric pressure of 1 atm when immersed in water or in contact with moist soil.

BRIEF DESCRIPTION OF THE DRAWINGS

The features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

Figure 1:
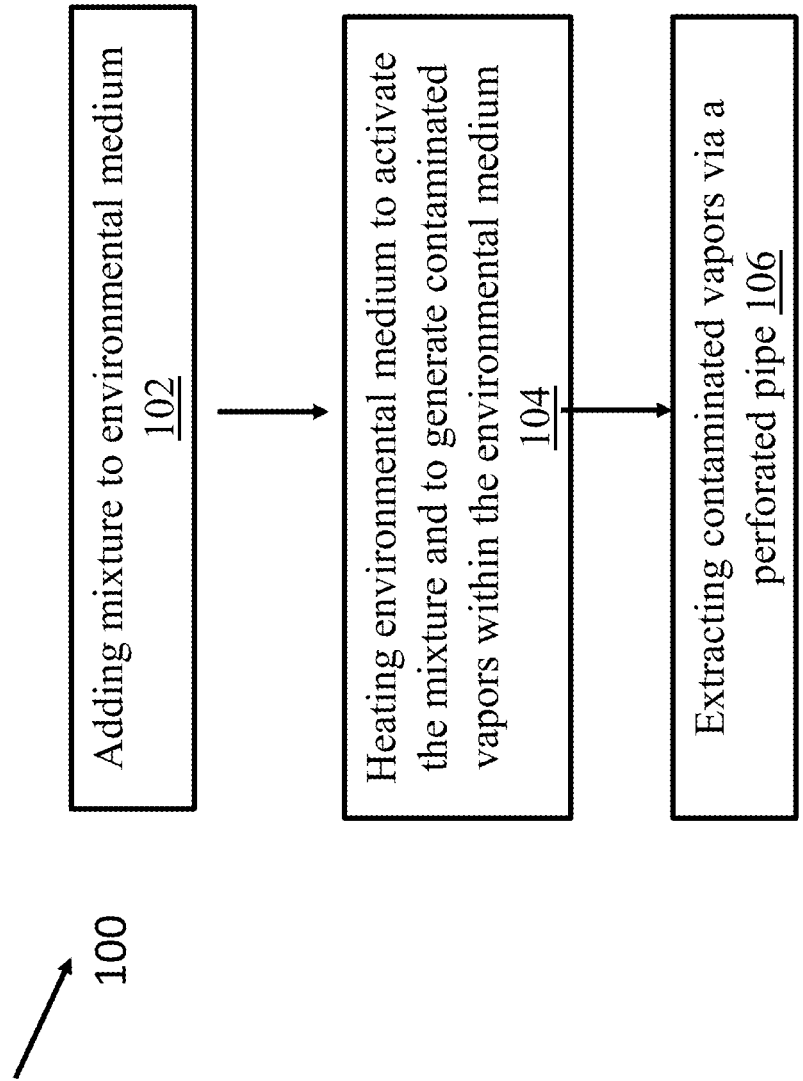
FIG. 1 is a flow chart illustrating a method for treating an environmental medium having organic contaminants, in accordance with an embodiment of the disclosure.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

The disclosed method optimizes energy usage and increases remediation efficiency during thermal remediation techniques. The thermal remediation techniques are configured for evaporating, volatizing, and thus removing the organic contaminants from the environmental medium. The ISTR techniques include TCH, ERH, and SEE. In the disclosed method, the mixture upon activation with initial heating provides further heat required for evaporating the organic contaminants, thereby optimizing the energy usage. Further, when the mixture is added, it converts the organic contaminants such as halogenated straight chain hydrocarbons into non-toxic byproducts namely ethane and a chloride through biogeochemical processes.

Embodiments of the present disclosure will be described below in detail with reference to the accompanying figures.

As shown in FIG. 1, the method 100 is for treating an environmental medium having organic contaminants. At step 102, a mixture is added to the environmental medium. The environmental medium containing the mixture in step 102 is heated at step 104 by an external energy source to evaporate the organic contaminants within the environmental medium to generate contaminated vapors. The boiling points of various organic contaminants in environmental medium are reached in the following order: separate-phase nonaqueous phase liquids (NAPL) in contact with water or soil moisture, followed by organic contaminants, and, finally, uncontaminated groundwater.

The mixture in step 102 includes a metal powder. As the mixture is heated by an external energy source, it undergoes an exothermic reduction-oxidation (redox) reaction. Oxygen reacts with the metal powder to yield metal oxide, rust, and heat. The mixture acts as an additional heat source for the evaporation of organic contaminants within the environmental medium to generate contaminated vapors. The mixture further may include a powdered activated carbon (PAC). PAC is a porous material that holds water necessary for the oxidizing reaction to occur. It's also thermally conductive, so it helps spread heat evenly. The mixture can further include a catalyst to amplify the reaction and to accelerate the generation of metal oxide, rust, and heat.

At step 106, contaminated vapors are extracted via a perforated pipe, thereby removing the organic contaminants in a gaseous form from the environmental medium. The organic contaminants have an initial boiling point in range of 50° C. to 400° C., when immersed in water or in contact with moist soil, measured at a standard atmospheric pressure of 1 atm. It should be noted that when an organic contaminant is immersed in water or in contact with moist soil, the combined boiling point is depressed as described by Dalton's Law of Partial Pressures that states the total pressure of a mixture of gases is equal to the sum of the partial pressures of the component gases. Boiling points of common chlorinated ethenes are summarized in Table 1 as shown below.

TABLE 1

| | Boiling Point in Air | Boiling Point in Water |
|---|---|---|
| Perchloroethylene (PCE) | 121° C. | 87° C. |
| Trichloroethene (TCE) | 87° C. | 65° C. |
| 1,1-Dichloroethene (1,1-DCE) | 32° C. | 31° C. |

Figure 2:
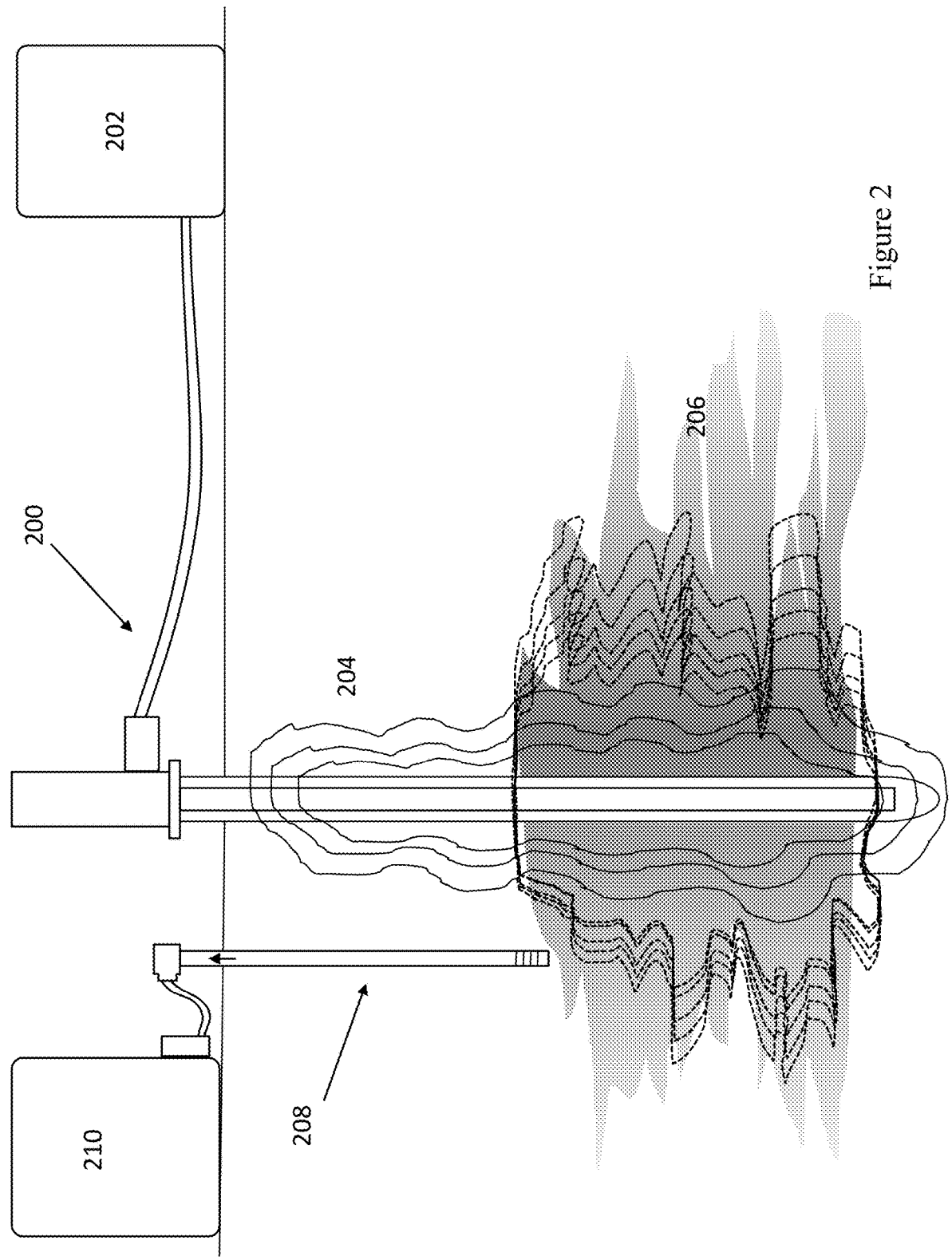
FIG. 2 is a schematic representation of a method for treating an environmental medium having organic contaminants, in accordance with an embodiment of the disclosure.

FIG. 2 is a schematic representation of a method for treating an environmental medium having organic contaminants, in accordance with an embodiment of the disclosure. The external energy source 202 is used to heat the environmental medium. The heating components 204 for heating the environmental medium are inserted in the environmental medium with respect to a ground surface. In one embodiment, the heating components 204 may be placed horizontally. In another embodiment, the heating components 204 may be placed vertically. In another embodiment, the heating components 204 may be placed in an oblique direction with respect to the ground surface. The mixture 204 is injected within the environmental medium comprising water, an aquifer or a porous medium. The mixture may also be mixed into the environmental medium comprising soil. During heating, the organic contaminants are volatilized and extracted via at least one vapor extractor. The treatment system further includes an option for treatment of liquid condensate. The contaminated vapors are extracted via a perforated pipe 206, thereby removing the organic contaminants in a gaseous form from the environmental medium. In some embodiments, the contaminated vapors are further treated in a suitable equipment 210. Suitable equipment for vapor treatment includes thermal oxidation, combustion devices that control VOC emissions by combusting them to carbon dioxide (CO2) and water, and granular activated carbon. In other embodiments contaminated vapors are cooled and condensed to produce a concentrated liquid solution. Suitable equipment for treating contaminated concentrated liquids include a combination of bulk-phase separation to remove free product from the liquid stream, and granular activated carbon or air stripping processes to remove dissolved organic contaminants.

Figure 3:
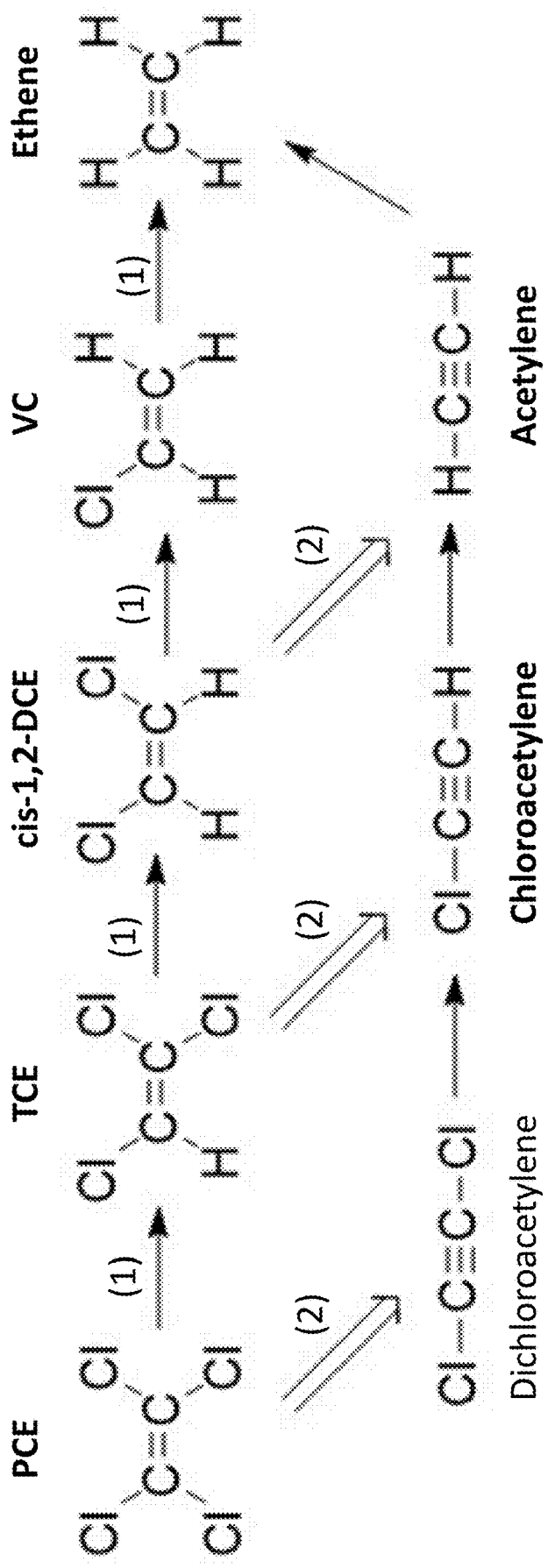
FIG. 3 is a schematic representation of biotic and abiotic degradation of organic contaminants, in accordance with an embodiment of the disclosure.

FIG. 3 is a schematic representation of biotic and abiotic degradation of organic contaminants, in accordance with an embodiment of the disclosure. Zero valent iron (ZVI) provides both biotic and abiotic degradation pathways involving the direct reaction of ZVI with the organic contaminants of the environmental medium. FIG. 3 shows the chemical formulations of PCE and its reduced daughter products all the way down to ethane. The top row of the schematic shows the sequential process that is typical of bioremediation where in this process, PCE is reduced to TCE and then subsequently to cis-1,2-DCE (with the possibility of minor amounts of trans-1,2-DCE and 1,1-DCE not shown in figure), VC, and finally benign ethane. The biotic transformation occurs through the sequential removal of one chlorine atom from the molecule coupled with its replacement with a hydrogen molecule. The bottom of the schematic shows the abiotic reduction of PCE. This is a process where PCE is reduced to dichloroacetylene, then to chloracetylene, and then to acetylene. The acetylene derivatives are short-lived intermediate compounds. The parent compounds, PCE, TCE, and cis-1,2-DCE to ethene and ethane abiotically is shown at the bottom of the schematic.

Figure 4:
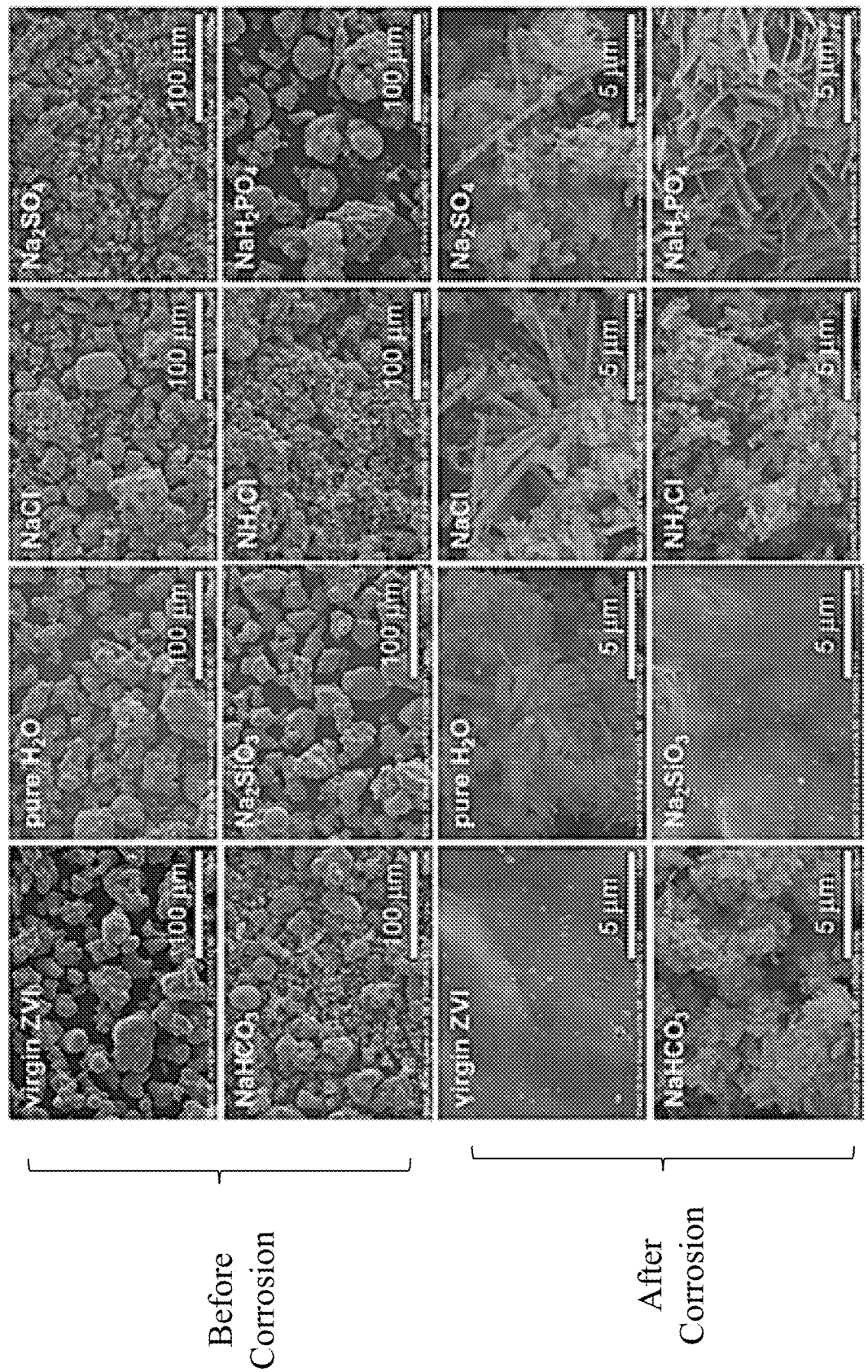
FIG. 4 is a scanning electron microscope (SEM) image demonstrating effect of brine solution on corrosion of metal particles, in accordance with an embodiment of the disclosure.

FIG. 4 is an SEM image demonstrating effect of brine solution on corrosion of metal particles, in accordance with an embodiment of the disclosure. The reaction between iron and moist air or water that produces rust is a an exothermic process and generates heat. Compounds may be added to the mixture that speeds up the process. The addition of sodium chloride (NaCl), sodium sulfate ($Na_2SO_4$), sodium bicarbonate ($NaHCO_3$), sodium silicate ($Na_2SiO_3$), ammonium chloride ($NH_4Cl$), and monosodium phosphate ($NaH_2PO_4$) to the mixture serves as a catalyst to accelerate the corrosion of the metal powder.

In an embodiment, the mixture has powdered activated carbon, a catalyst, or a combination thereof along with the metal powder. PAC is thermally conductive and is added to the mixture to store the heat generated by the metal powder. It also aids in spreading heat evenly within the environmental medium. PAC with mean diameter ($D_{50}$) of less than 50 microns and a bulk density of 0.2 to 0.6 g/cc is selected. The mixture along with PAC aids in the exothermic reaction by providing enough heat for the method to become self-sustaining. At this point, no additional heat is needed to have the reaction continue. The metal powder, the powdered activated carbon, and the catalyst are in a weight ratio in a range of 5:1:0.1 to 5:5:1.

Mixtures comprising ZVI powder, PAC, and NaCl will react with oxygen and moisture in air to yield iron oxide, rust, and heat. This reaction will reach temperatures of 70° C. to 94° C., reducing the amount of energy needed to heat the environmental medium. Furthermore, 1-to-3-micron ZVI powder and 4-to-10-micron ZVI powder has an ignition temperature of 428° C. and 489° C., respectively. Once ignited, the ZVI enhances smoldering combustion to destroy heavy organic contaminants like creosotes and coal tars.

The mixtures, including mixtures of ZVI with PAC, provide for a multi-treatment approach including in situ Chemical Reduction (ISCR) and in situ sorption. ZVI is effective in remediation as it enables the transformation of pervasive toxic organic solvents such as carbon tetrachloride ($CCl_4$), chloroform ($CHCl_3$), TCE ($C_2HCl_3$), and PCE ($C_2Cl_4$) into non-toxic byproducts. For example, TCE can be reduced to ethane and chloride according to the following reaction.

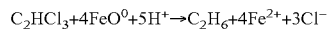

$$C_2HCl_3 + 4FeO^0 + 5H^+ \rightarrow C_2H_6 + 4Fe^{2+} + 3Cl^-$$

The addition of PAC also provides for direct sorption of the contaminants from the environmental medium. PAC is very effective for VOCs and SVOCs reduction. These contaminants are adsorbed by PAC mainly through van der Waals forces. As the contaminated vapors flow through an environmental medium treatment zone the contaminants are retarded due to adsorption onto PAC. The sorption of the contaminants increases the residence time within the treatment zone and therefore also increases contact with the metal powder and the applied heat.

In one embodiment, the catalyst may be ammonium chloride ($NH_4Cl$), monosodium phosphate ($NaH_2PO_4$), sodium sulfate ($Na_2SO_4$), sodium chloride (NaCl), sodium bicarbonate ($NaHCO_3$), or mixtures thereof. The catalyst accelerates an exothermic reaction occurring between the metal powder and oxygen in presence of moisture present in the environmental medium.

As observed from scanning electron microscope (SEM) images provided in FIG. 4, except for $Na_2SiO_3$, the brine solutions enhance ZVI corrosion in the following hierarchy from the highest corrosion enhancement to the lowest:

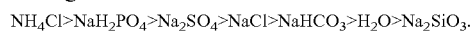

$NH_4Cl > NaH_2PO_4 > Na_2SO_4 > NaCl > NaHCO_3 > H_2O > Na_2SiO_3$.

The chemical reactions illustrating the corrosion process of ZVI in FIG. 4 are as follows:

$$4Fe_3O_4 + O_2 + 18H_2O \rightarrow 12Fe(OH)_3$$

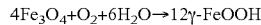

$$4Fe_3O_4 + O_2 + 6H_2O \rightarrow 12\gamma\text{-FeOOH}$$

The addition of a brine solution to the mixture acts as the catalyst that accelerates the exothermic reaction. Selection of the catalyst ($NH_4Cl$, $NaH_2PO_4$, $Na_2SO_4$, $NaCl$, $NaHCO_3$, and mixtures thereof) to accelerate the corrosion of the ZVI is based on site specific geochemical conditions. Due to its low cost and availability, sodium chloride (NaCl) is used as a catalyst to accelerate the exothermic reaction.

In another embodiment, the metal powder may include finely divided metals, metal carbonyls and mixtures thereof. The finely divided metals may be iron, aluminum, magnesium, Raney nickel, or zinc. The metal carbonyls may be nickel carbonyl, or iron pentacarbonyl.

In some embodiments, the metal powder has microscale zerovalent metal particles. The microscale zerovalent metal particles have an acid-washed and iron-based powder with a mean diameter in a range of 1 to 10 microns and an iron content of at least 90% by weight.

The size of reacting metal particles has a profound effect on its ability to generate heat. Smaller size particles with larger surface area per unit volume leads to a larger amount of net heat released by the exothermic reaction (larger $\Delta H$, enthalpy change). In general, ZVI with diameters less than 10 micron are considered a combustible dust (2012 OSHA Hazard Communication Standard 29 CFR 1910.1200). ZVI with diameters less than 5 micron are classified as flammable (U.S. Department of Transportation).

Metal powders (finely divided metals and metal carbonyls), having mean diameter less than 10-micron may react exothermically with oxygen and generate heat. When mixed with PAC, they may be used as an additional heat source for thermal remediation. The addition of the brine solution to the mixture serves as a catalyst to accelerate the exothermic reaction. The combination of the mixture with heat overcomes many of the limitations or environmental impacts of existing approaches. The advantage of the disclosed process is that the organic contaminants are treated in the environmental medium with moderate application of external energy and may reduce the carbon footprint of conventional heat-based approaches.

In yet another embodiment, the environmental medium is heated to a temperature in a range of 100° C. to 490° C. In certain embodiments, the heat is applied by TCH, ERH, and SEE so that the metal powder particles react exothermically to the oxygen in the environmental medium and produced iron oxide and generate additional heat.

In certain embodiments, the heat may be applied by vertical, horizontal, or combination of vertical and horizontal points installed within the treatment zone of the environmental medium.

In another embodiment, heating components for heating the environmental medium are inserted horizontally, vertically, and/or in an oblique direction in the environmental medium with respect to a ground surface.

In one embodiment, the environmental medium comprises soil, water, an aquifer or a porous medium.

In one embodiment, the organic contaminants are halogenated and non-halogenated straight chain hydrocarbons, halogenated and non-halogenated aromatic hydrocarbons, petroleum hydrocarbons, fuel constituents, PAHs, pesticides, herbicides, PFAS, PCBs or 1,4 dioxane. Fuel constituents include benzene, ethylbenzene, toluene, xylene, MTBE, TBA, and EDB. The PAHs include naphthalene and coal tars/creosote. The pesticides include organochlorides such as DDT. The herbicides include agent orange, a mixture of equal parts of two herbicides (weed killers), 2,4,5-T and 2,4-D having a boiling point of 371.9° C. at 1 atmosphere. PFAS is a large family of man-made chemicals that encompasses thousands of individual compounds including perfluorooctanoic acid (PFOA) and perfluorooctane sulfonate (PFOS). A common PFAS contaminate is AFFF PFOS a long-chain PFAS found in older stocks of AFFF and PFOA, a side product created during the manufacturing process for AFFF.

In an embodiment, the mixture may be added at the heating points, injection points, injection wells, or mechanically mixed with the environmental medium.

In one embodiment, the mixture may be added to the environmental medium by placing an injection rod or an injection well into the environmental medium and introducing the mixture by gravity feeding, an induced gas stream, under pressure, or a combination thereof. The mixture may be introduced at a pressure in a range of 5 pounds per square inch gauge (psig) to 4000 psig. In one embodiment, the mixture may be added to the soil by physically mixing the mixture with the soil to create a contact between the mixture and the soil. It is for treating excavated soils in soil piles on-site.

In yet another embodiment, the perforated pipes are installed horizontally, vertically, and/or in an oblique direction in the environmental medium with respect to a ground surface.

EXAMPLES

The following examples are intended as illustrative and non-limiting and represent specific embodiments of the present disclosure. The examples describe a method for in situ remediation of recalcitrant organic and inorganic contaminants in a soil or in an aquifer.

Example 1

A saturated subsurface layer with silts and clays containing 4% to 5% organic matter, approximately 20 feet below ground surface, 10 feet in thickness, and an area of approximately 60 feet by 200 feet contaminated with dissolved chlorinated ethenes (such as PCE and daughter compounds TCE and DCE) through releases to the subsurface from the surface is chosen. A mixture consisting of ZVI powder, PAC, monosodium phosphate, and sodium sulfate is added to the environmental medium using direct push technology (DPT). Monosodium phosphate and sodium sulfate are added as catalysts to accelerate an exothermic reaction occurring between the ZVI powder and oxygen in the presence of moisture in the environmental medium. Monosodium phosphate also provides a source of phosphorus for subsequent heat enhanced bioremediation after the subsurface layer begins to cool and approaches the ambient temperature. Sodium sulfate also provides a source of sulfate to react with iron and organic matter present in the environmental medium to generate iron sulfide (FeS) for biogeochemical reductive dichlorination. DPT injection points are installed five feet on center each way. An injection rod is placed into the environmental medium and the mixture is introduced under pressure. Heating components for heating the environmental medium and perforated pipes for extracting contaminated vapors are inserted vertically in the environmental medium with respect to the ground surface. The heating components are energized, heating the environmental medium to the boiling point of water. During heating, the chlorinated ethenes are volatilized in the subsurface and extracted via an above-grade vapor system. The above-grade vapor system is designed to extract and treat the chlorinated ethene contaminated vapors. The negative pressure in the perforated pipes for extracting contaminated vapors is created by a vacuum pump. The vacuum pulls the water (steam) and chlorinated ethene vapors through the environmental medium, and up the perforated pipe to the ground surface for treatment. The above-grade vapor system further includes granular activated carbon for treatment of vapors and any liquid condensate.

Example 2

A soil layer with silts and clays, approximately 2,500 cubic yards, contaminated with C9-C20 petroleum hydrocarbons, n-alkanes and 2-ring PAHs, through releases to the surface is chosen. The contaminated soils are excavated and staged in a pile with a length of 210 feet, width of 45 feet, and a center height of 10 feet. As the pile is constructed, a mixture consisting of ZVI powder, PAC, and monosodium phosphate is added and blended into the contaminated soil. Monosodium phosphate is added as a catalyst to accelerate an exothermic reaction occurring between the ZVI powder and oxygen in the presence of moisture in the environmental medium and provide a source of phosphorus for subsequent heat enhanced bioremediation after the pile begins to cool and approaches ambient temperature. Heating pipes for heating the contaminated soil and perforated pipes for extracting contaminated vapors are installed horizontally with respect to the ground surface during construction of the pile. The distance between the pipes is 5 feet each way. Once the pile is constructed, the heating components are energized. The soil pile is heated to 350° C. During heating, the C9-C20 petroleum hydrocarbons are volatilized in the soil pile and extracted via an above-grade vapor system that is designed to extract and treat C9-C20 petroleum hydrocarbons contaminants. The negative pressure in the perforated pipes for extracting contaminated vapors is created by a vacuum pump. The vacuum pulls the water (steam) and C9-C20 petroleum hydrocarbons vapors through the environmental medium, and through the perforated pipe to a thermal oxidizer for treatment of contaminated vapors. Liquid condensate is treated using a combination of bulk-phase separation to remove free product from the liquid stream, and air stripping followed by granular activated carbon to remove dissolved organic contaminants.

Example 3

Groundwater beneath a fire training facility is contaminated with aqueous film-forming foam (AFFF). The saturated subsurface layer with silts and silty clays, approximately 10 feet below ground surface, 10 feet in thickness, and an area of approximately 100 feet by 200 feet was chosen. A mixture of ZVI powder, PAC, and sodium chloride is added to the environmental medium using DPT. Sodium chloride is added as a catalyst to accelerate an exothermic reaction occurring between the ZVI powder and oxygen in the presence of moisture in the environmental medium. The mixture injection points are installed five feet on center each way. An injection rod is placed into the environmental medium and the mixture is introduced under pressure. Heating components for heating the environmental medium and perforated pipes for extracting per- and polyfluoroalkyl substances (PFAS) contaminated vapors are inserted vertically in the environmental medium with respect to the ground surface. The distance between the heating components is 5 feet each way. The heating components are energized, heating the environmental medium to 400° C. During heating, the PFAS contaminants is volatilized in the subsurface and extracted via an above-grade vapor system that is designed to extract and treat the PFAS contaminants. The negative pressure in the perforated pipes for extracting contaminated vapors is created by a vacuum pump. The vacuum pulls the water (steam) and PFAS vapors through the environmental medium, and up the perforated pipe to the ground surface for treatment. The PFAS contaminated vapors are cooled and condensed to produce a concentrated liquid PFAS solution. The system further includes an activated carbon and/or ion exchange for treatment of the condensed liquid PFAS solution.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method for treating an environmental medium having organic contaminants, the method comprising:
adding a mixture to the environmental medium, wherein the environmental medium is selected from the group consisting of soil, water, an aquifer, and a porous medium;
heating the environmental medium along with the mixture by an external energy source to generate vapors of the organic contaminants, wherein the mixture upon heating acts as an additional heat source, and wherein the mixture comprises a metal powder; and
extracting the vapors of the organic contaminants via a perforated pipe, thereby removing the organic contaminants in a gaseous form from the environmental medium, wherein the organic contaminants have a boiling point in a range of 50° C. to 400° C. at a standard atmospheric pressure of 1 atm.

2. The method as claimed in claim 1, wherein the mixture further comprises powdered activated carbon, a catalyst, or a combination thereof.

3. The method as claimed in claim 1, wherein the metal powder is selected from the group consisting of finely divided metals, metal carbonyls and mixtures thereof.

4. The method as claimed in claim 3, wherein the finely divided metals are selected from the group consisting of iron, aluminum, magnesium, Raney nickel, zinc and the metal carbonyls are selected from the group consisting of nickel carbonyl, and iron pentacarbonyl.

5. The method as claimed in claim 1, wherein the metal powder comprises microscale zerovalent metal particles.

6. The method as claimed in claim 5, wherein the microscale zerovalent metal particles comprise an acid-washed and iron-based powder with a mean diameter in a range of 1 to 10 microns and an iron content of at least 90% by weight.

7. The method as claimed in claim 2, wherein the catalyst is selected from the group consisting of ammonium chloride ($NH_4Cl$), monosodium phosphate ($NaH_2PO_4$), sodium sulfate ($Na_2SO_4$), sodium chloride (NaCl), sodium bicarbonate ($NaHCO_3$), and mixtures thereof, and wherein the catalyst accelerates an exothermic reaction occurring between the metal powder and oxygen in presence of moisturepresent in the environmental medium.

8. The method as claimed in claim 2, wherein the powdered activated carbon has a mean diameter of 1 to 50 microns and a bulk density in a range from 0.2 to 0.6 g/cc.

9. The method as claimed in claim 2, wherein the metal powder, the powdered activated carbon, and the catalyst are in a weight ratio in a range of 5:1:0.1 to 5:5:1.

10. The method as claimed in claim 2, wherein the metal powder, the powdered activated carbon, and the catalyst are in a weight ratio of 5:1:1.

11. The method as claimed in claim 1, wherein the organic contaminants are halogenated and non-halogenated straight chain hydrocarbons, halogenated and non- halogenated aromatic hydrocarbons, petroleum hydrocarbons, fuel constituents, polycyclic aromatic hydrocarbons (PAHs), pesticides, herbicides, poly-and perfluoroalkyl substances (PFAS), 1,4-dioxane, polychlorinated biphenyls (PCBs), wherein the fuel constituents comprise benzene, ethylbenzene, toluene, xylene, methyl tertiary butyl ether (MTBE), tertiary butyl alcohol (TBA), and ethylene dibromide (EDB), wherein the PAHs comprise naphthalene and coal tars/creosote, wherein the pesticides comprise DDT, and wherein the herbicides comprise agent orange.

12. The method as claimed in claim 1, wherein adding the mixture to the environmental medium is carried out by placing an injection rod or an injection well into the environmental medium and introducing the mixture by gravity feeding, an induced gas stream, under pressure, or a combination thereof, and wherein the environmental medium is soil.

13. The method as claimed in claim 12, wherein introducing the mixture is performed at a pressure in a range of 5 psig to 4000 psig.

14. The method as claimed in claim 12, wherein adding the mixture to the soil comprises physically mixing the mixture with the soil to create a contact between the mixture and the soil.

15. The method as claimed in claim 1, wherein the environmental medium is heated to a temperature in a range of 100° C. to 490° C.

16. The method as claimed in claim 1, further comprising inserting the external energy source horizontally, vertically, or in an oblique direction in the environmental medium with respect to a horizontal reference.

17. The method as claimed in claim 1, further comprising installing the perforated pipe horizontally, vertically, or in an oblique direction in the environmental medium with respect to a horizontal reference.

* * * * *